Oct. 22, 1946.  T. H. JENKINS  2,409,684
BOTTLE CARRIER
Filed July 10, 1945  2 Sheets-Sheet 1
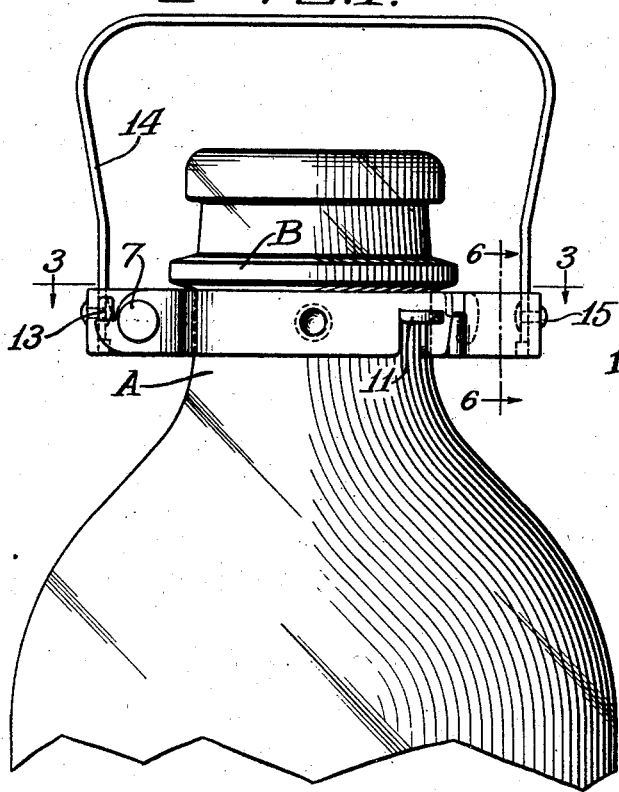
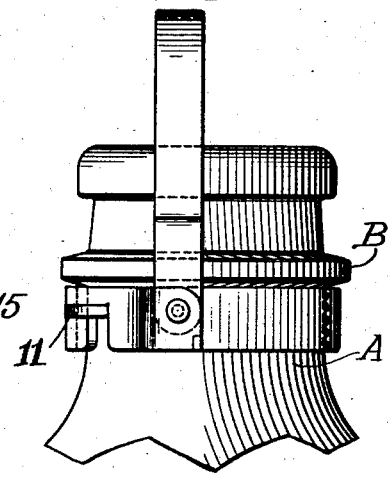
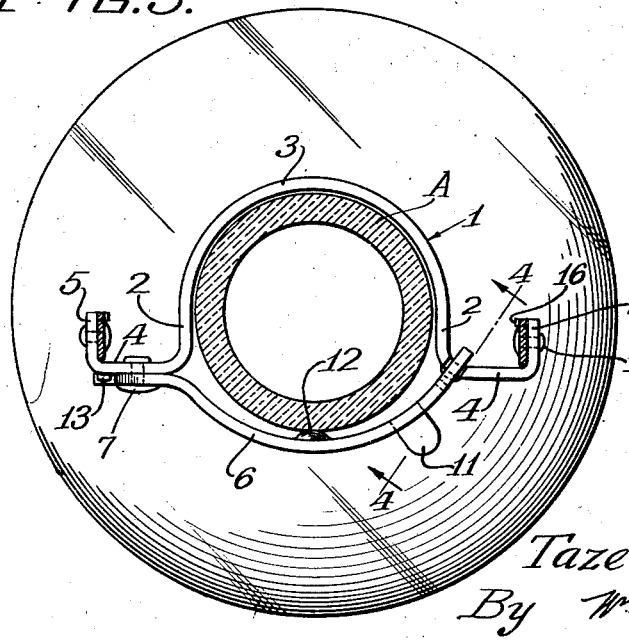
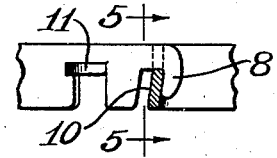
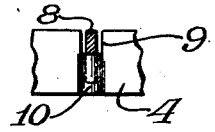
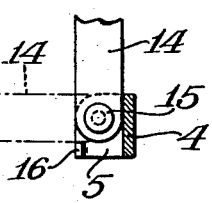
Inventor:
Tazewell H. Jenkins
By Wm. F. Freudenreich
Attorney Oct. 22, 1946.  T. H. JENKINS  2,409,684
BOTTLE CARRIER
Filed July 10, 1945  2 Sheets-Sheet 2
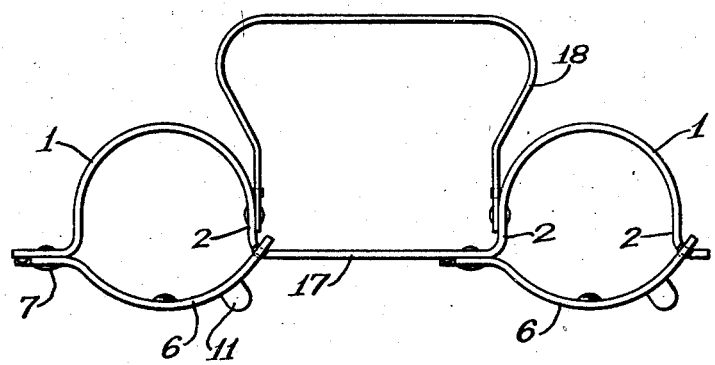
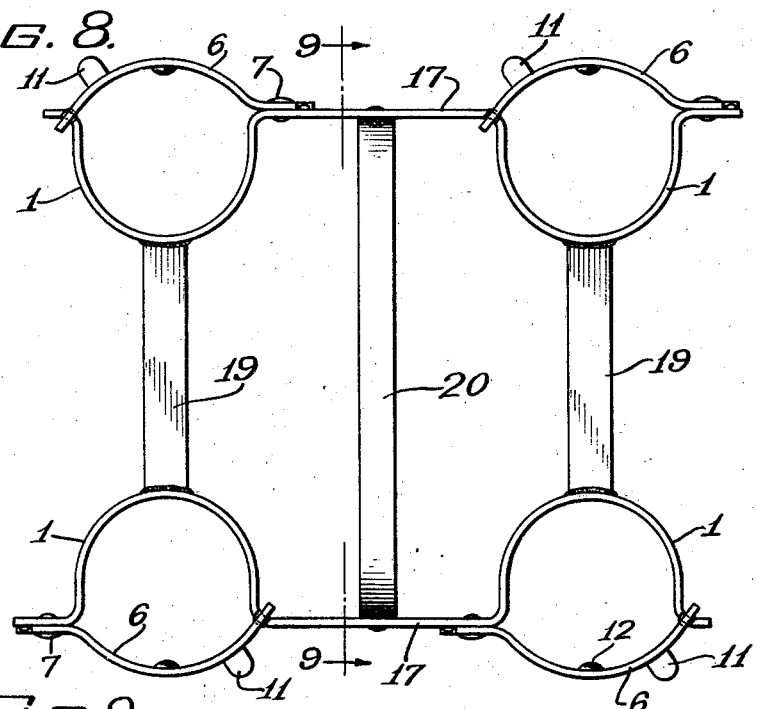
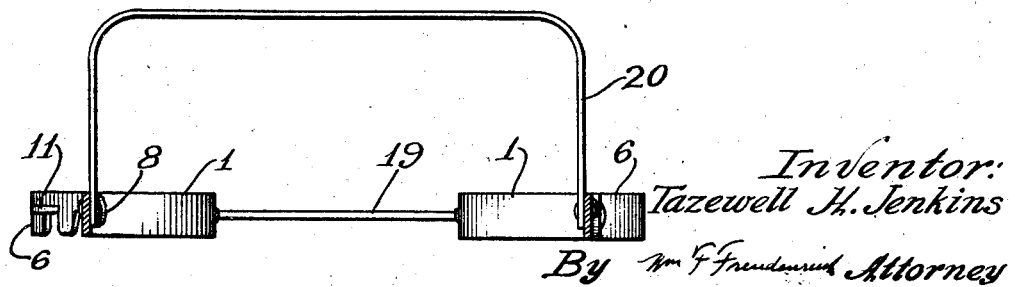
Inventor:
Tazewell H. Jenkins
By Wm F Freudenrich Attorney Patented Oct. 22, 1946

2,409,684

UNITED STATES PATENT OFFICE 2,409,684

BOTTLE CARRIER

Tazewell H. Jenkins, Chicago, Ill.

Application July 10, 1945, Serial No. 604,169

13 Claims. (Cl. 224—45)

In my prior Patent No. 2,160,662 there is disclosed a simple wire bottle carrier that may be easily attached to the neck of a bottle and provided a bail for conveniently and safely carrying the bottle. The present invention may be said to have for its object to produce a device that shall possess all of the advantages of this prior device, together with new ones.

The devices of my prior patent are usually left indefinitely on milk bottles, for example, being taken off only when a bottle is broken. A specific object of the present invention is to produce a carrier which not only can be applied as easily and under the same conditions as the prior device, but can also be quickly removed by finger pressure; whereby the carrier can be instantly taken off either at the time of delivery of a bottle to a customer or upon the return of the bottle for cleaning and refilling.

It is sometimes desirable to be able to carry a plurality of bottles by means of a single handle; and, considered in one of its aspects, the present invention may be said to have for an object to combine a plurality of my new devices in a single unit to produce a multiple carrier.

The various features of novelty whereby my invention is characterized will hereinafter be pointed out with particularity in the claims; but, for a full understanding of the invention and of its objects and advantages, reference may be had to the following detailed description taken in connection with the accompanying drawings, wherein:

Figure 1 is a side elevational view of the upper part of a bottle having a device embodying the present invention attached thereto; Fig. 2 is a view looking at the bottle from a point to the right thereof as it appears in Fig. 1; Fig. 3 is a section on line 3—3 of Fig. 1; Fig. 4 is a section on line 4—4 of Fig. 3; Fig. 5 is a section on line 5—5 of Fig. 4; Fig. 6 is a section on line 6—6 of Fig. 1; Fig. 7 is a top plan view of a carrier for two bottles, embodying the invention disclosed in Figs. 1–6, the handle being down; Fig. 8 is a plan view of a carrier for four bottles, namely four of the new carriers for individual bottles connected together in a single unit; and Fig. 9 is a section on line 9—9 of Fig. 8.

In the drawings, I have illustrated my invention as embodied in devices for carrying milk bottles and, for the sake of brevity, only this particular use will be discussed; it being understood that by bottles I mean not only milk bottles but any containers to which the carriers are or may be adapted.

Referring to Figs. 1–6 of the drawings, A represents the neck of a bottle and B a collar surrounding the neck and projecting outwardly therefrom. As in my earlier device, the carrier is based on the use of a divided ring or loop to surround the bottle neck below the collar. Instead of making this part in a single piece, however, I construct it of two pieces, preferably heavy band stock of resilient metal standing on edge. One of the pieces 1 is in the form of a U having short straight arm elements 2, connected by a semicircular part 3, to which the arms are tangent. The free ends of the arms are bent outwardly as at 4 to form wings and then rearwardly, as at 5, to provide ears parallel to but outward from the arms. The other piece 6, curved on a radius much greater than that of part 3, constitutes a bar or gate to close the loop about the bottle neck. One end of bar member 6 lies flat against one of the wings 4 and is secured thereto by a pin 7 that creates a hinge joint to permit the bar to swing in a plane at right angles to the plane of the loop. The free end of bar 6 is fashioned into a hook 8 that is adapted to swing down over the second wing 4 and interlock therewith. In order that the upper edge faces of the two loop-forming members may lie in the same plane when the bar or gate member is swung down, the second wing 4 has a notch 9 cut down through its upper edge for the reception of the shank of the hook on the bar; the notch being as deep as the shank of the hook. Preferably, also, the metal of the wing, below the notch, is deformed, so that the rear surface slants forwardly and downwardly. Then, by giving a complementary slant to the working edge of the hook, the loop must be contracted or distorted in order to pull the hook up while the loop is under tension. A small section of the bar, in the lower half thereof, is partly severed from the rest of the bar and turned up to produce a finger piece 11 that projects outwardly near the free end of the bar. On the rear or inner side of the bar, about midway between the ends, is a projection or lug 12, that may conveniently be created by deforming the metal to fashion a rounded or dome-shaped bulge.

The parts are so proportioned that, with the bar 6 lifted, member 1 may be slipped on the neck of the bottle, underneath the collar, from one side. The finger piece on the bar may then be pressed to swing the bar down until the hook engages in the notch in member 1; the projection or bulge 12 snapping past the collar on the bottle and against the side of the bottle neck, as shown in Fig. 3. While the curved portion of the U in member 1 should be an approximate fit for the bottle neck, the arm is of flatter curvature; so that, with the bulge on the arm engaged with the bottle neck, the body of the bar recedes farther and farther from the neck from the middle to the ends. This, together with the tangent positions of arm portions 2 of member 1, permits the structure to be sprung sufficiently to effect the interlock and close the device on the bottle, and still remain under sufficient tension to grip the bottle after the arm has snapped under the collar or, at least, when it is attempted to unhook the arm. To take the device off, one need only press or pull up on the finger piece, the closed loop being thereby distorted sufficiently to allow the arm to swing up past the collar on the bottle.

Means are preferably provided to prevent arm 6 from swinging down past the plane of member 1. This can conveniently be accomplished by providing member 1 with a lug 13 against which the arm strikes when swung down into a horizontal position.

The bail 14, by which the device and the bottle to which it is attached are carried, may be a metal strap bent into the form of an inverted U, the ends of which lie flat against the ears 5 of member 1 and are pinned thereto by rivets 15. When the bail is in its up or carrying position, one edge of each arm thereof bears against the adjacent wing, as best shown in Fig. 6; and, the hinge axis of the bail being a little to one side of the axis of the bottle, the weight of the bottle, during carrying, presses the wings 4 against the bail to produce the effect of a bail that is rigidly attached to the bottle. The bail is preferably limited to a swinging movement of ninety degrees, namely between the vertical position in Figs. 1 and 2 and a horizontal position; each of the ears 5 having an inturned lug 16 at the bottom and adjacent to the free vertical edge. As plainly shown in Fig. 6, wings 4 prevent the bail from swinging in the clockwise direction past a vertical position, whereas it can move in the counterclockwise direction until it engages the lugs 16.

It will be seen that when the bail is grasped and the bottle lifted, the loop or ring of the carrier is pressed against the under side of the collar on the bottle, so that the heavier the bottle, the more tightly is the hook on arm 6 held in locking position. Consequently there is no possibility of accidental release of the bottle from the carrying device while being carried.

When a carrier for two bottles is desired, two of the bottle embracing devices are connected together by a bar 17 as shown in Fig. 7. This bar is integral with both of the U shaped members 1, being a continuation of the two inside wings. Or, in other words, the two U members 1 and the bar 17 are formed from a single band or strip. A bail 18 spans the distance between members 1 and is hinged directly to the straight arm portions 2 thereof.

Two of the units illustrated in Fig. 7 may be combined to produce a carrier for four bottles. As shown in Figs. 8 and 9, the two units are symmetrically disposed with respect to a plane between and parallel to the bars 17. Corresponding members 1 are connected together by struts or spacers 19 extending between and welded thereto. A bail 20 may conveniently span the distance between the bars 17 and be hinged to the latter.

I claim:

1. A carrying device for a bottle having a neck provided with a collar, comprising a U-shaped member of resilient metal and a bar hinged at one end to one arm of the U so as to be capable of swinging from a vertical position down over the second arm, said bar having a part at its free end to hook over said second arm, the free ends of the arms of the U extending outwardly and then back parallel to said arms in the plane of the U, and a bail connected to the back-turned parts of the arms of the U, the parts being so proportioned that when the bar is down the distance between the middle of the arm and the closed end of the U is less than the diameter of the collar.

2. A carrying device for a bottle having a neck provided with a projecting collar, comprising a U-shaped member of resilient metal shaped so as partially to surround such neck below the collar, a bar hinged at one end to one end of said member for swinging movements about an axis transverse to the plane of said member, said member having a notch in the top near the other end, a hook on the free end of the bar for entering said notch and engaging the back side of said member, said bar having a projection on the inner side remote from both ends to snap past the collar when the device is applied to the bottle and the hook is engaged in the notch, and carrying means connected to said member.

3. A device as set forth in claim 2, wherein the bar is provided with a finger piece projecting outwardly therefrom near the free end.

4. A carrying device for a bottle having a neck provided with a projecting collar, comprising a long narrow member of resilient metal shaped so as partially to surround such neck below the collar, an arm hinged at one end to one end of said member for swinging movements about an axis transverse to the plane of said member, said member having a notch in the top near the other end, a hook on the free end of the arm for entering said notch and engaging the inner side of said member, said arm having a projection on the inner side remote from both ends to snap past the collar on the bottle when the device is applied to the bottle and the hook is engaged in the notch, and a bail connected to opposite ends of said member.

5. A bottle carrying device comprising a band of resilient metal shaped to form a loop, with the band arranged on edge, to surround a bottle neck loosely below a projecting collar on the latter, the band being in two sections hinged together for relative swinging movements about an axis at right angles to the plane of the loop, one section being U-shaped and having a notch in the upper edge near the end remote from the hinge, the second section being curved on a radius substantially greater than that of the bottle neck and having at its free end a hook adapted to enter said notch and engage with the rear side of the first section, and carrying means connected to the first section of the band.

6. A device as set forth in claim 5, wherein the projection on the second section is rounded to permit it to snap upwardly and downwardly past the collar.

7. A device as set forth in claim 5, wherein that part of the hook that engages the rear side of the band, below the notch, slopes downwardly.

8. A device as set forth in claim 5, wherein the surfaces of the hook and the band, that engage on the rear side of the band, slope downwardly and forwardly.

9. A bottle carrying device comprising a band of resilient metal shaped to form a loop, with the band arranged on edge, to surround a bottle neck below a projecting collar on the latter, the band being in two sections hinged together for relative swinging movements about an axis at right angles to the plane of the loop, one section having a notch in the upper edge near the end remote from the hinge, the second section having at its free end a hook adapted to enter said notch and engage with the rear side of the first section, and the second section having on the inner side, between the ends, a projection that holds the rest of that section out of contact with side of the bottle neck when the hook is in the notch, the extreme end portions of the first section being extended outwardly and rearwardly to provide parallel ears, and a bail spanning the space between said ears and hinged thereto.

10. A device as set forth in claim 9, wherein means are provided to limit the swinging movements of the bail to an angle of about ninety degrees in one direction from a position in which the bail is at right angles to the plane of the loop.

11. A bottle carrying device comprising a band of resilient metal shaped to form a loop, with the band arranged on edge, to surround a bottle neck below a projecting collar on the latter, the band being in two sections hinged together for relative swinging movements about an axis at right angles to the plane of the loop, one section having a notch in the upper edge near the end remote from the hinge, the second section having at its free end a hook adapted to enter said notch and engage with the rear side of the first section, a portion of the second section near the free end being partially severed therefrom and bent laterally to provide a finger piece, and carrying means connected to the first section of the band.

12. A carrying device for bottles having necks provided with projecting collars, comprising a long, narrow member of resilient metal shaped at each end into a U adapted partially to surround a bottle neck below the collar, two relatively flat bars each hinged at one end to the free end of the outer arm of each U for swinging movements about an axis transverse to the plane of the U, each U having a notch in the top of the inner arm, a hook on the free end of each bar for entering the corresponding notch and engaging the rear side of the arm containing that notch, and carrying means in the form of a bail hinged at its ends to the inner arms of the U's.

13. A carrying device for four bottles having necks provided with projecting collars, comprising two long, narrow members of resilient metal each shaped at each end into a U adapted partially to surround a bottle neck below the collar, a bar hinged at one end to the free end of the outer arm of each U for swinging movements about an axis transverse to the plane of said member, each U having a notch in the top of the inner arm, a hook on the free end of each bar for entering the corresponding notch and engaging the rear side of the arm containing that notch, connecting pieces between and welded to the U's at corresponding ends of said members, and a bail extending between and hinged to said members at their middle.

TAZEWELL H. JENKINS.